2,865,973

STORAGE BATTERY PLATES

George S. Hartman, Roslyn, and Abraham L. Levine, Levittown, Pa., assignors to The Electric Storage Battery Company, a corporation of New Jersey No Drawing. Application June 24, 1953
Serial No. 363,911

2 Claims. (Cl. 136—20)

This invention relates to new articles of manufacture in the form of battery electrodes or plates and to methods of producing them.

It has heretofore been proposed to impregnate porous carbon or porous graphite in shapes suitable for use as electrodes or plates of batteries, and while such arrangements have been relatively satisfactory, much remains in improving the efficiency of use of the active material.

In accordance with the present invention it has been found that the capacity of a battery may be increased to a substantial degree, of the order of 25%–30% above that of like batteries having the same amount of active material. The present invention is particularly applicable to plates or electrodes made of porous materials which are electrically conductive and in which the active material may be deposited throughout the pores. In order to achieve the increase in capacity without a corresponding increase in active material, the porous plate has first deposited throughout the interstitial surfaces a gas-permeable layer of metal impervious to the electrolyte forming a part of the battery.

In the preferred form of the invention the porous plates are first impregnated with a plating solution. They are then immersed in a plating bath, and by controlled electrolysis there is electrically deposited throughout the pores and over the interstitial surfaces a thin layer of metal. For a battery in which the active material is nickel hydrate, a nickel electrode may be used for the plating. However, it is within the scope of the invention to use the thin metallic coating of metals differing from that used in the active material. Thus, for example, where the active material is nickel hydrate, the electrolytically deposited coating may be cadmium, silver or zinc, or other metals inert to the battery electrolyte and to the active material and which have similar capabilities of being electrolytically deposited in a thin layer. Similarly, other active materials may be used with any one of the metals, providing the thin metallic coating is inert to the active material.

While the unexpected increase in efficiency of use of the active material, as reflected by the increased capacity of the battery, is an accomplished fact, a theory taking into account all of the variables has not as yet been fully developed.

Without limiting the invention, an effort to present an exposition as to what occurs now appears indicated. The thin gas-pervious coating throughout and over the interstitial surfaces increases the electrical conductivity of the plate, a recognized advantage. The thin metallic coating also increases the strength of the plates, making them less susceptible to breakage in handling and in subsequent use. However, it is believed that the increased efficiency of use of the active material may result from the mechanism by means of which the active material is deposited within the pores of the plate. By way of example, if the porous electrode be impregnated with nickel nitrate which is later precipitated with a suitable alkali, such as sodium or potassium hydroxide, crystals of nickel hydrate will form within the pores. The crystal growth likely occurs from the carbon or graphite surface of the pore, the crystals being discrete and with separation distances between them.

To introduce into the electrode the desired amount of active material, more than one impregnating step is needed. After thorough washing of the plate to remove the precipitating material, it is again impregnated with nickel nitrate and the precipitating agent again applied. It is believed there then arises a preferential growth of additional crystals either enlarging or attaching themselves to the crystals of nickel hydrate resulting from the first impregnating step.

By first coating the surfaces of the pores with a thin gas-pervious metallic layer, it is believed there is provided a metallic surface with respect to which crystal growth will begin without preferential growth of crystals resulting from the first impregnating step. The result is that a greater proportion of the active material will be in good electrical and chemical contact with the metallic surface coating, and thus with the increased area of contact, there will be a greater efficiency of use of the active material.

Further in accordance with the invention and also supporting the theory as explained above is the fact that the time required for impregnating the porous plates has been reduced by 25%–30% as compared with the impregnation time of porous grids not having the thin metallic coating throughout the pores. By a preferential formation of the active material along and over the metallic surface, the pores themselves are less obstructed as a result of each impregnating step, and thus less time is required to deposit a given amount of active material.

It has been found that the thickness of the metallic coating and its character is fairly critical. It is necessary that the metallic coating be pervious to gas and impervious to liquid. This condition is met if the coating or layer of metal be mono-molecular. It should be quite thin, of the order of 0.001" (25 microns) or less. Where pores of exceedingly small size extend throughout the battery electrode, for example, pores ranging below five microns, the metal coating will be nearer the mono-molecular thickness than the 0.001" which has in some cases proven satisfactory.

Further in accordance with the invention, the layer of thin metal forms a protective coating for the interstitial surface of the porous material and thus minimizes or eliminates oxidation at the liquid interface which would otherwise exist between the porous material and the electrolyte. While it is well known that graphite is less subject to oxidation than carbon, nevertheless, even with graphite plates there will be present some carbon, and there will be for that reason areas particularly susceptible to oxidation. Graphite itself is oxidizable to a degree. If oxidation occurs, the result is a loss of material at the interface between the active material and the interstitial surface, thus creating a void between the active material and the interstitial surface. The lack of intimate contact between the porous material of the plate and the active material reduces the electrical efficiency. The presence of the thin metallic coating presents a surface resistant to oxidation and minimizes the foregoing effect with resultant maintenance of efficiency of operation over substantial periods of time.

While the range of thickness of the thin metal layer has been given as from mono-molecular to about 0.001", and while reference has been made to the fact that the layer may be pervious to gas but impervious to liquid, it is to be understood that as the thickness decreases, the thin layer will be pervious to some liquids. Even though pervious to battery electrolyte, the rate of oxidation of graphite or carbon or of the porous plate material is so much decreased and the conductivity and efficiency of impregnation so greatly increased that the advantages of the present invention are to large degree realized. The metal thickness, while it may somewhat exceed about 0.001", may not exceed it in such degree that the layer will be impervious to gas since ultimately there will be in the plates sealed pores in which gas pressures could rise to destructive values.

The thickness of the interstitial metallic coating is readily controlled by reason of the electro-deposition thereof upon the interstitial surfaces. Those skilled in the art need but apply Faraday's law to predetermine to the requisite accuracy said thickness. It will be desirable, however, to utilize a cathodic plating current of relatively low current density, such for example, as about 0.1 ampere per square inch, and less, against pure nickel anodes.

Further in accordance with the invention, a battery plate or electrode made pursuant to the method thus far described may in its preferred form be provided with an electrical conductor corresponding with the lugs of battery plates in the following manner.

The plate itself is masked with material impervious and inert with respect to a plating bath except for a selected area at which the electrical conductor is to be secured. Though not essential, it is preferred that the exposed area shall be along not more than the face and/or an edge of the plate and shall not extend, for example, from one face of the plate, over the edge and downwardly along the opposite face of the plate. With the plate masked as described, it is then placed in a plating bath and electrolyzing current flows between a nickel anode and the plate for deposition of metallic nickel over the surface of the unmasked area. The current densities are not of great importance in the operation. Densities of from 0.002 of an ampere to 2.0 amperes per square inch have been successfully used, the plating operation being continued until there has been deposited an impervious coating having a thickness of about 0.002" or more. The plate is then removed from the bath, thoroughly washed and dried, after which the desired electrical conductor is secured thereto. By providing the desired area with a coating of non-porous or gas-impervious metal, the electrical conductor may be integrally bonded or joined thereto in the same manner as generally utilized for uniting metallic conductors as, for example, by soldering, brazing or welding.

In a further preferred form of the invention, the porous plates may be provided with recesses of shape complementary to those of the electrical conductors to be used. The surfaces of such recesses are then coated with the non-porous impervious layer of metal, after which the electrical conductor is placed therein and bonded to the coating. This form of the invention is preferred since the electrical conductors then occupy a space between the opposite surfaces of the plate, thus taking up a minimum amount of space and providing for assembly of the plates with minimum spacing therebetween. In accordance with the present feature of the invention there is avoided high contact resistance between the battery lugs and the plates; there is avoided the possibility of electrolytic oxidation at the critical area in which current leaves or enters the plates.

Since the plate is masked for the foregoing operations, it will be understood the coating of the exposed areas may be done prior to impregnation of the plate with active material.

While preferred forms of the invention have been disclosed, it is to be understood modifications may be made and features added or omission of certain features, all within the scope of the appended claims.

What is claimed is:

1. A battery electrode comprising, in combination a porous graphite matrix, a gas-pervious coating of nickel over the interstitial surfaces of said matrix, the thickness of said coating being on the order of 0.001 inch or less, said coating presenting a surface to which nickel hydrate will preferentially adhere relative to the material of said matrix, nickel hydrate distributed throughout the pores of said matrix, a gas-impervious layer of metal on a restricted area of said matrix adjacent an edge of said matrix, and an electrical conductor bonded to said gas-impervious layer.

2. A method of producing battery electrodes comprising the steps of impregnating the porous graphite matrix with a nickel plating solution, electroplating onto interstitial surfaces of said porous matrix a gas-pervious nickel coating on the order of 0.001 inch or less, removing said electroplating solution from said matrix, depositing nickel hydrate within the metal-coated pores of said matrix by repeated impregnation, precipitation, washing, and drying, the nickel coating presenting a surface to which the precipitated nickel hydrate preferentially adheres, exposing a restricted area of said matrix to a metallic electroplating solution, depositing over said restricted area a gas-impervious layer of metal, and bonding an electrical conductor to said gas-impervious layer.

References Cited in the file of this patent

UNITED STATES PATENTS

| Re. 10,544 | Brush | Dec. 23, 1884 |
| 884,930 | Jungner | Apr. 14, 1908 |
| 928,963 | Gugler | July 27, 1909 |
| 1,639,280 | Benner et al. | Aug. 16, 1927 |
| 2,626,294 | Brennan | Jan. 20, 1953 |
| 2,658,099 | Basset | Nov. 3, 1953 |
| 2,737,541 | Coolidge | Mar. 6, 1956 |

FOREIGN PATENTS

| 653,235 | Great Britain | May 9, 1951 |

OTHER REFERENCES

Heise, G. W.: "Porous Carbon Electrode," Transactions of the Electrochemical Society, LXXV, 1939, page 166.